(12) United States Patent
Ziminsky et al.

(10) Patent No.: US 12,553,385 B2
(45) Date of Patent: Feb. 17, 2026

(54) COMPACT TURBOMACHINE COMBUSTOR

(71) Applicant: GE Vernova Infrastructure Technology LLC, Greenville, SC (US)

(72) Inventors: Willy Steve Ziminsky, Simpsonville, SC (US); Mark William Pinson, Greer, SC (US); Jayaprakash Natarajan, Greenville, SC (US); Lucas John Stoia, Greenville, SC (US)

(73) Assignee: GE Vernova Infrastructure Technology LLC, Greenville, SC (US)

( * ) Notice: Subject to any disclaimer, the term of this patent is extended or adjusted under 35 U.S.C. 154(b) by 0 days.

(21) Appl. No.: 16/833,954

(22) Filed: Mar. 30, 2020

(65) Prior Publication Data

US 2021/0301722 A1    Sep. 30, 2021

(51) Int. Cl.
*F02C 7/00* (2006.01)
*F02C 7/22* (2006.01)
*F23R 3/28* (2006.01)

(52) U.S. Cl.
CPC ............... *F02C 7/22* (2013.01); *F23R 3/28* (2013.01); *F05D 2240/35* (2013.01)

(58) Field of Classification Search
CPC .... F02C 7/22; F23R 3/28; F23R 3/002; F23R 3/283; F23R 3/286; F23R 3/34; F05D 2240/35
See application file for complete search history.

(56) References Cited

U.S. PATENT DOCUMENTS

| 4,100,733 | A | | 7/1978 | Striebel et al. |
| 4,408,461 | A | | 10/1983 | Bruhwiler et al. |
| 4,845,952 | A | | 7/1989 | Beebe et al. |
| 4,898,001 | A | * | 2/1990 | Kuroda ............... F23R 3/28 |
| | | | | 60/737 |

(Continued)

FOREIGN PATENT DOCUMENTS

| EP | 1443190 A1 | 8/2004 |
| EP | 2660519 A1 | 11/2013 |

(Continued)

OTHER PUBLICATIONS

European Search Report Corresponding to Application No. 21161897 on Aug. 12, 2021.

(Continued)

*Primary Examiner* — Edwin Kang
(74) *Attorney, Agent, or Firm* — Dority & Manning, P.A.

(57) ABSTRACT

Combustors, gas turbines, and associated methods of operation are provided. A method for operating a combustor includes firing a bundled tube fuel nozzle assembly within a combustion liner of the combustor to generate combustion gases at a first temperature within a first combustion zone length. The method further includes firing a fuel injector downstream from the bundled tube fuel nozzle assembly within the combustion liner of the combustor to generate combustion gases at a second temperature within a second combustion zone length. The first combustion zone length is less than the second combustion zone length. The combustion gases travel through the first combustion zone length in a first time period and through the second combustion zone length in a second time period. The second time period is less than the first time period.

10 Claims, 7 Drawing Sheets

(56) References Cited

U.S. PATENT DOCUMENTS

| | | |
|---|---|---|
| 4,966,001 A | 10/1990 | Beebe et al. |
| 5,361,586 A | 11/1994 | McWhirter et al. |
| 5,943,866 A | 8/1999 | Lovett et al. |
| 6,038,862 A | 3/2000 | Melman et al. |
| 6,164,055 A | 12/2000 | Lovett et al. |
| 6,920,762 B2 | 7/2005 | Wells et al. |
| 7,578,130 B1 | 8/2009 | Kraemer et al. |
| 7,886,991 B2 | 2/2011 | Zuo et al. |
| 8,147,121 B2 | 4/2012 | Lacy et al. |
| 8,261,555 B2 | 9/2012 | Uhm et al. |
| 8,407,892 B2 | 4/2013 | DiCintio et al. |
| 8,875,516 B2 | 11/2014 | Uhm et al. |
| 8,904,798 B2 | 12/2014 | Manoharan et al. |
| 8,919,137 B2 | 12/2014 | DiCintio et al. |
| 8,925,324 B2 | 1/2015 | Berry et al. |
| 8,943,832 B2 | 2/2015 | Uhm et al. |
| 9,010,120 B2 | 4/2015 | DiCintio et al. |
| 9,133,722 B2 | 9/2015 | LeBegue et al. |
| 9,134,030 B2 | 9/2015 | Bathina et al. |
| 9,188,335 B2 | 11/2015 | Uhm et al. |
| 9,347,668 B2 | 5/2016 | Westmoreland et al. |
| 9,353,950 B2 | 5/2016 | Uhm et al. |
| 10,415,831 B2 | 9/2019 | Hoffman et al. |
| 2006/0156730 A1 | 7/2006 | Dinu et al. |
| 2007/0125093 A1* | 6/2007 | Burd .................. F23R 3/04 60/752 |
| 2008/0268387 A1 | 10/2008 | Saito et al. |
| 2010/0293959 A1* | 11/2010 | Remy .................. F23R 3/36 60/776 |
| 2011/0083439 A1 | 4/2011 | Zuo et al. |
| 2012/0111014 A1* | 5/2012 | Beran .................. F23R 3/28 60/758 |
| 2012/0180487 A1 | 7/2012 | Uhm et al. |
| 2012/0297785 A1* | 11/2012 | Melton .................. F23R 3/02 60/772 |
| 2013/0045450 A1* | 2/2013 | Uhm .................. F23R 3/045 431/8 |
| 2013/0104556 A1 | 5/2013 | Uhm et al. |
| 2013/0180255 A1* | 7/2013 | Shershnyov .......... F23R 3/346 60/772 |
| 2013/0213051 A1 | 8/2013 | Westmoreland, III et al. |
| 2013/0283810 A1 | 10/2013 | Idahosa et al. |
| 2013/0318975 A1 | 12/2013 | Stoia et al. |
| 2014/0083110 A1 | 3/2014 | Stewart et al. |
| 2014/0116054 A1 | 5/2014 | Means et al. |
| 2014/0150434 A1 | 6/2014 | Belsom et al. |
| 2014/0157779 A1 | 6/2014 | Uhm et al. |
| 2014/0338338 A1 | 11/2014 | Chila et al. |
| 2015/0052905 A1 | 2/2015 | Carnell, Jr. et al. |
| 2015/0219336 A1* | 8/2015 | Crothers .................. F23R 3/46 60/726 |
| 2015/0226435 A1 | 8/2015 | Melton et al. |
| 2015/0276226 A1* | 10/2015 | Laster .................. F23R 3/34 60/731 |
| 2016/0040882 A1 | 2/2016 | Cihlar et al. |
| 2016/0047317 A1 | 2/2016 | Willis et al. |
| 2016/0146469 A1 | 5/2016 | Lum et al. |
| 2016/0178206 A1 | 6/2016 | Yoshino et al. |
| 2016/0305327 A1* | 10/2016 | Patel .................. F23R 3/14 |
| 2017/0003030 A1* | 1/2017 | Benjamin .............. F23D 11/386 |
| 2017/0152748 A1 | 6/2017 | Kasperski ............... B22C 9/10 |
| 2017/0284675 A1* | 10/2017 | North .................. F23R 3/46 |
| 2017/0299188 A1* | 10/2017 | Horikawa ................ F02C 3/04 |
| 2017/0343216 A1 | 11/2017 | McMahan et al. |
| 2018/0112875 A1 | 4/2018 | Daniel |
| 2018/0135533 A1* | 5/2018 | Sorato .................. F02C 9/48 |
| 2018/0163558 A1* | 6/2018 | Vondrell ................ F01D 15/10 |
| 2018/0187607 A1* | 7/2018 | Hughes .................. F23R 3/346 |
| 2018/0187893 A1 | 7/2018 | DiCintio et al. |
| 2018/0209651 A1 | 7/2018 | Cai et al. |
| 2018/0216471 A1* | 8/2018 | Rathay .................. F01D 5/147 |
| 2018/0230812 A1* | 8/2018 | Lim .................. F01D 5/186 |
| 2018/0292089 A1* | 10/2018 | Porter .................. F23R 3/04 |
| 2018/0328177 A1* | 11/2018 | Turner .................. F01D 5/084 |
| 2018/0328588 A1* | 11/2018 | Lemon .................. F23R 3/36 |
| 2019/0056112 A1 | 2/2019 | Natarajan et al. |
| 2019/0309952 A1 | 10/2019 | Miduturi et al. |

FOREIGN PATENT DOCUMENTS

| | | |
|---|---|---|
| EP | 3495736 A1 | 6/2019 |
| JP | 2013250047 A | 12/2013 |

OTHER PUBLICATIONS

European Search Report Corresponding to Application No. 23160812 on May 31, 2023.

* cited by examiner

COMPACT TURBOMACHINE COMBUSTOR

FIELD

The present disclosure relates generally to a combustor. More specifically, the disclosure relates to a combustor for a gas turbine engine.

BACKGROUND

Turbomachines are utilized in a variety of industries and applications for energy transfer purposes. For example, a gas turbine engine generally includes a compressor section, a combustion section, a turbine section, and an exhaust section. The compressor section progressively increases the pressure of a working fluid entering the gas turbine engine and supplies this compressed working fluid to the combustion section. The compressed working fluid and a fuel (e.g., natural gas) mix within the combustion section and burn in a combustion chamber to generate high pressure and high temperature combustion gases. The combustion gases flow from the combustion section into the turbine section where they expand to produce work. For example, expansion of the combustion gases in the turbine section may rotate a rotor shaft connected to a load, e.g., to a generator to produce electricity. The combustion gases then exit the gas turbine via the exhaust section.

In many known combustion systems, the mixed working fluid and fuel are ignited at a generally upstream portion of the combustor, i.e. within the combustion chamber, to generate a working turbine operating temperature. The extremely high working temperature of combustion gases must be sustained from the combustion chamber to the exit of the combustor in order to produce optimal work within the turbine. However, because the generation of nitrogen oxide (NOx) is exponential with temperature and linear with time, sustaining the high working temperature from the combustion zone to the combustor exit is a large contributing factor for emissions in many known combustion systems.

Thus, an improved combustor is desired in the art. In particular, an improved combustor that optimally minimizes the amount of time the combustion gases spend at peak temperature is desired in the art.

BRIEF DESCRIPTION

Aspects and advantages of the present disclosure will be set forth in part in the following description, or may be obvious from the description, or may be learned through practice of the technology.

In accordance with one embodiment, a combustor is provided. The combustor includes an end cover defining a forward end of the combustor. The combustor also includes a combustion liner having an upstream end and a downstream end. The combustor further includes a bundled tube fuel nozzle assembly. The bundled tube fuel nozzle assembly includes a plurality of bundled tube fuel nozzles that are fluidly coupled to the end cover at the upstream end of the combustion liner and extend to a plurality of outlets in a cap plate. The cap plate defines a diameter of the bundled tube fuel nozzle assembly. The combustor further includes a plurality of fuel injectors coupled to the combustion liner and disposed downstream from the plurality of bundled fuel nozzles and upstream from the aft frame. The aft frame coupled to the downstream end of the combustion liner. The combustion liner defines a combustion zone between the plurality of outlets and the aft frame through which combustion gases travel over a total time period. The combustion zone includes a first combustion zone defined between the plurality of outlets and the plurality of fuel injectors through which combustion gases from the plurality of bundled tube fuel nozzles flow over a first portion of the total time period. The combustion zone further includes a second combustion zone defined between the plurality of fuel injectors and the aft frame through which combustion gases from the plurality of bundled tube fuel nozzles and the plurality of fuel injectors flow over a second portion of the total time period. The second portion of the total time period is between about 30% and about 50% of the total time period.

In accordance with another embodiment, a gas turbine is provided. The gas turbine includes a compressor, a turbine, and a combustor disposed downstream from the compressor and upstream from the turbine. The combustor includes an end cover defining a forward end of the combustor. The combustor also includes a combustion liner having an upstream end and a downstream end. The combustor further includes a bundled tube fuel nozzle assembly. The bundled tube fuel nozzle assembly includes a plurality of bundled tube fuel nozzles that are fluidly coupled to the end cover at the upstream end of the combustion liner and extend to a plurality of outlets in a cap plate. The cap plate defines a diameter of the bundled tube fuel nozzle assembly. The combustor further includes a plurality of fuel injectors coupled to the combustion liner and disposed downstream from the plurality of bundled fuel nozzles and upstream from the aft frame. The aft frame coupled to the downstream end of the combustion liner. The combustion liner defines a combustion zone between the plurality of outlets and the aft frame through which combustion gases travel over a total time period. The combustion zone includes a first combustion zone defined between the plurality of outlets and the plurality of fuel injectors through which combustion gases from the plurality of bundled tube fuel nozzles flow over a first portion of the total time period. The combustion zone further includes a second combustion zone defined between the plurality of fuel injectors and the aft frame through which combustion gases from the plurality of bundled tube fuel nozzles and the plurality of fuel injectors flow over a second portion of the total time period. The second portion of the total time period is between about 30% and about 50% of the total time period.

In accordance with another embodiment, a method of operating a combustor is provided. The method includes firing a bundled tube fuel nozzle assembly within a combustion liner of the combustor. As a result, combustion gases at a first temperature are generated within a first combustion zone length. The method further includes firing a fuel injector downstream from the bundled tube fuel nozzle assembly within the combustion liner of the combustor. As a result, combustion gases at a second temperature are generated within a second combustion zone length. The first combustion zone length is less than the second combustion zone length.

These and other features, aspects and advantages of the present systems and methods will become better understood with reference to the following description and appended claims. The accompanying drawings, which are incorporated in and constitute a part of this specification, illustrate embodiments of the technology and, together with the description, serve to explain the principles of the technology.

BRIEF DESCRIPTION OF THE DRAWINGS

A full and enabling disclosure of the present combustors and gas turbines, including the best mode of making and using the present systems and methods, directed to one of ordinary skill in the art, is set forth in the specification, which makes reference to the appended figures.

DETAILED DESCRIPTION

Figure 1:
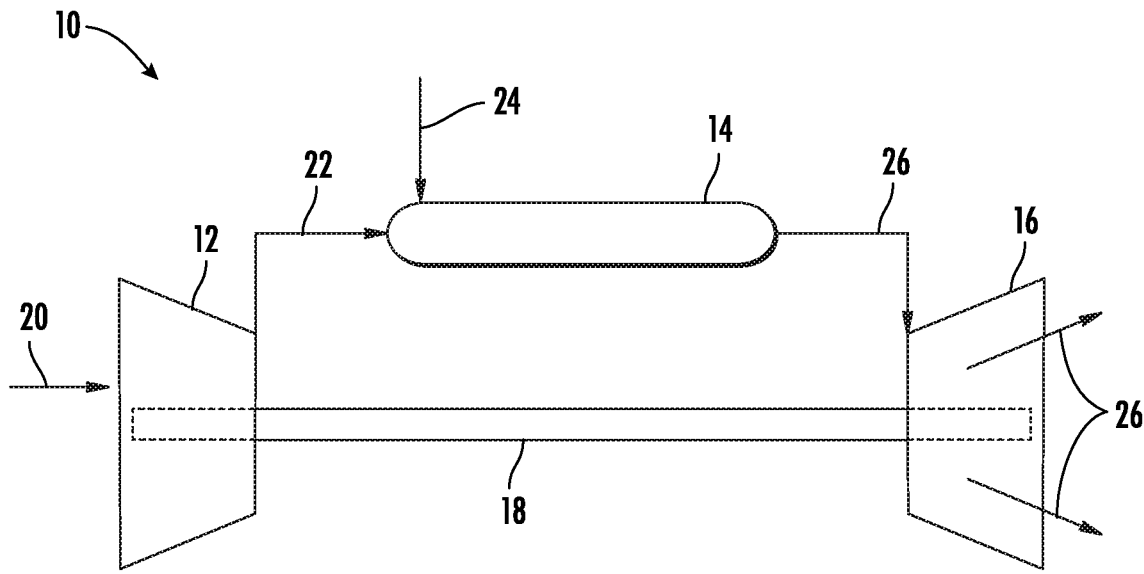
FIG. 1 illustrates a functional block diagram of an exemplary gas turbine, in accordance with embodiments of the present disclosure.

Reference now will be made in detail to embodiments of the present systems and method, one or more examples of which are illustrated in the drawings. Each example is provided by way of explanation, rather than limitation of, the technology. In fact, it will be apparent to those skilled in the art that various modifications and variations can be made in the present technology without departing from the scope or spirit of the claimed technology. For instance, features illustrated or described as part of one embodiment can be used with another embodiment to yield a still further embodiment. Thus, it is intended that the present disclosure covers such modifications and variations as come within the scope of the appended claims and their equivalents.

The detailed description uses numerical and letter designations to refer to features in the drawings. Like or similar designations in the drawings and description have been used to refer to like or similar parts of the invention. As used herein, the terms "first", "second", and "third" may be used interchangeably to distinguish one component from another and are not intended to signify location or importance of the individual components.

As used herein, the terms "upstream" and "downstream" refer to the relative direction with respect to fluid flow in a fluid pathway. For example, "upstream" refers to the direction from which the fluid flows, and "downstream" refers to the direction to which the fluid flows. The term "radially" refers to the relative direction that is substantially perpendicular to an axial centerline of a particular component; the term "axially" refers to the relative direction that is substantially parallel and/or coaxially aligned to an axial centerline of a particular component; and the term "circumferentially" refers to the relative direction that extends around the axial centerline of a particular component.

As used herein, terms of approximation, such as "generally," "about," or "substantially" include values within ten percent greater or less than the stated value. When used in the context of an angle or direction, such terms include within ten degrees greater or less than the stated angle or direction. For example, "generally vertical" includes directions within ten degrees of vertical in any direction, e.g., clockwise or counter-clockwise.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Referring now to the drawings, FIG. 1 illustrates a schematic diagram of an exemplary gas turbine 10. The gas turbine 10 generally includes a compressor 12, at least one combustor 14 disposed downstream of the compressor 12 and a turbine 16 disposed downstream of the combustor 14. Additionally, the gas turbine 10 may include one or more shafts 18 that couple the compressor 12 to the turbine 16.

During operation, air 20 flows into the compressor 12 where the air 20 is progressively compressed, thus providing compressed or pressurized air 22 to the combustor 14. At least a portion of the compressed air 22 is mixed with a fuel 24 within the combustor 14 and burned to produce combustion gases 26. The combustion gases 26 flow from the combustor 14 into the turbine 16, wherein energy (kinetic and/or thermal) is transferred from the combustion gases 26 to rotor blades (not shown), thus causing the shaft 18 to rotate. The mechanical rotational energy may then be used for various purposes such as to power the compressor 12 and/or to generate electricity. The combustion gases 26 may then be exhausted from the gas turbine 10.

Figure 2:
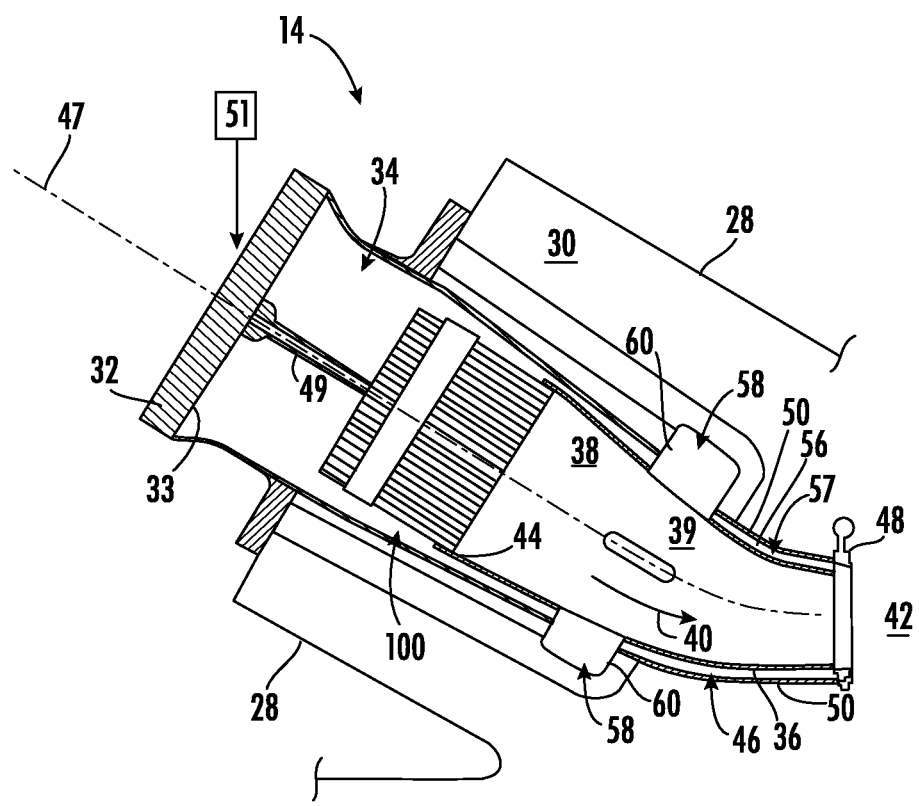
FIG. 2 illustrates a simplified cross-sectional side view of an exemplary combustor, in accordance with embodiments of the present disclosure.

FIG. 2 provides a cross-sectional side view of an exemplary combustor as may incorporate various embodiments of the present disclosure. As shown, the combustor 14 defines an axial direction A, a radial direction R, and a circumferential direction C. In general, the axial direction A extends parallel to an axial centerline 47 of the combustor 14, the radial direction R extends generally orthogonal to the axial centerline 47, and the circumferential direction C extends generally concentrically around the axial centerline 47. As shown in FIG. 2, the combustor 14 may be at least partially surrounded by an outer casing 28 such as a compressor discharge casing. The outer casing 28 may at least partially define a high pressure plenum 30 that at least partially surrounds various components of the combustor 14. The high pressure plenum 30 may be in fluid communication with the compressor 12 (FIG. 1) to receive a portion of the compressed air 22 therefrom. An end cover 32 may be coupled to the outer casing 28.

A bundled tube fuel nozzle assembly 100 may extend axially downstream from the end cover 32. The bundled tube fuel nozzle assembly 100 may be disposed within the outer casing 28 downstream from and/or axially spaced from the end cover 32 with respect to the axial centerline 47 of the combustor 14 and upstream from a first combustion zone 38. In particular embodiments, the fuel nozzle assembly 100 is in fluid communication with a fuel supply 51 via one or more fluid conduits 49. In particular embodiments, the fluid conduit(s) 49 may be fluidly coupled and/or connected to an inner surface 33 of the end cover 32. The bundled tube fuel nozzle assembly 100 may be configured to provide a first mixture of fuel 24 and compressed air 22 to the first combustion zone 38 for ignition.

One or more combustion liners or ducts 36 may at least partially define the first combustion chamber or zone 38 downstream from the one or more bundled tube fuel nozzles 34 and/or may at least partially define a hot gas path 40 through the combustor 14 for directing the combustion gases 26 (FIG. 1) towards an inlet 42 to the turbine 16. In particular embodiments, the combustion liner 36 may be formed from a singular body or unibody having an upstream or forward end 44 of the combustion liner 36 that is substantially cylindrical or round. The combustion liner 36 may then transition to a non-circular or substantially rectangular cross-sectional shape proximate to a downstream or aft end 46 of the combustion liner 36.

In particular embodiments, the aft end 46 of the combustion liner 36 may terminate at an aft frame 48. The aft frame 48 may be used to mount the combustion liner 36 to the outer casing 28 or to other support hardware, thereby fixing or axially restraining the aft end 46 of the combustion liner 36. As such, the forward end 44 of the combustion liner 36 may expand and contract axially towards the bundled tube fuel nozzle assembly 100 as the combustor 14 transitions through various thermal conditions associated with different operating modes.

In particular embodiments, the combustion liner 36 is at least partially circumferentially surrounded by an outer sleeve 50. The outer sleeve 50 may be formed as a single component or formed by multiple sleeve segments, such as by a flow sleeve and an impingement sleeve (not shown separately). The impingement sleeve may be slideably engaged with the flow sleeve to allow for axial relative movement therebetween. Alternately, the outer sleeve 50 may have a unified body (or "unisleeve") construction, in which the flow sleeve and the impingement sleeve are integrated with one another in the axial direction. The outer sleeve 50 may be radially spaced from the combustion liner 36 to define a cooling flow annulus 56 therebetween.

As shown in FIG. 2, in many embodiments, the cooling flow annulus 56 may fluidly couple the high pressure plenum to the bundled tube fuel nozzle assembly 100. For example, the outer sleeve 50 may define a plurality of inlets or holes (not shown) which provide fluid communication from the high pressure plenum 30 to the cooling flow annulus 56. Alternatively, or additionally, the outer sleeve 50 may include an inlet 57 located at the aft end of the combustor 14 that fluidly couples the cooling flow annulus 56 to the high pressure plenum 30.

In many embodiments, the compressed air 22 from the high pressure plenum 30 may flow upstream through the cooling flow annulus 56 to a head end portion or volume 34 of the combustor 14. Within the head end volume 34, the compressed air 22 may reverse directions and travel downstream through the bundled tube fuel nozzle assembly 100, where fuel 24 is introduced, such that a first mixture of fuel 22 and compressed air 22 is provided to the combustion zone 38. The head end portion 34 may be positioned between the end cover 32 and the plurality of bundled tube fuel nozzles 100 and may provide compressed air 22 for the bundled tube fuel nozzle assembly 100.

In particular embodiments, the outer sleeve 50 may be generally or substantially unrestrained in the axial direction with respect to the axial centerline 47 of the combustor 14. As such, the outer sleeve 50 may expand and contract axially towards the one or more bundled tube fuel nozzles 34 and/or towards the aft frame 48 as the combustor 14 transitions through various thermal conditions.

In various embodiments, as shown in FIG. 2, the combustor 14 includes at least one fuel injector(s) 60 axially offset from and disposed downstream from the bundled tube fuel nozzle assembly 100. The fuel injector 60 may extend radially through the outer sleeve 50, the cooling flow passage 56 and at least partially through the combustion liner 36. In particular embodiments, the combustor 14 includes a plurality of fuel injectors 60 annularly arranged about the combustion liner 36 and the outer sleeve 50. Each fuel injector 60 may be circumferentially spaced apart along the periphery of the outer sleeve 50.

The plurality of fuel injectors 60 may be configured to provide a second mixture of fuel 24 and compressed air 22 to a second combustion zone 39 for ignition. The combustion gases 26 generated by the fuel injectors 60 within the second combustion zone 39 may mix with the combustion gases 26 of the first combustion zone 38 and may have a temperature that is greater than the first combustion zone 38. The second combustion zone 39 may be defined within the combustion liner 36 downstream from the bundled tube fuel nozzle(s) 34 and/or the first combustion zone 38. In some embodiments, the second combustion zone 39 may be defined between the first combustion zone 38 and the aft frame 48. In many embodiments, the second combustion zone 39 may be defined immediately downstream of the first combustion zone 38.

Each fuel injector 60 may have an outlet shaped substantially as a geometric stadium, i.e., a rectangle having circular ends opposite one another. This shape advantageously allows each fuel injector to extend radially through the cooling flow annulus 56 without blocking a large portion of the compressed air 22 traveling axially through the cooling flow annulus 56.

Figure 3:
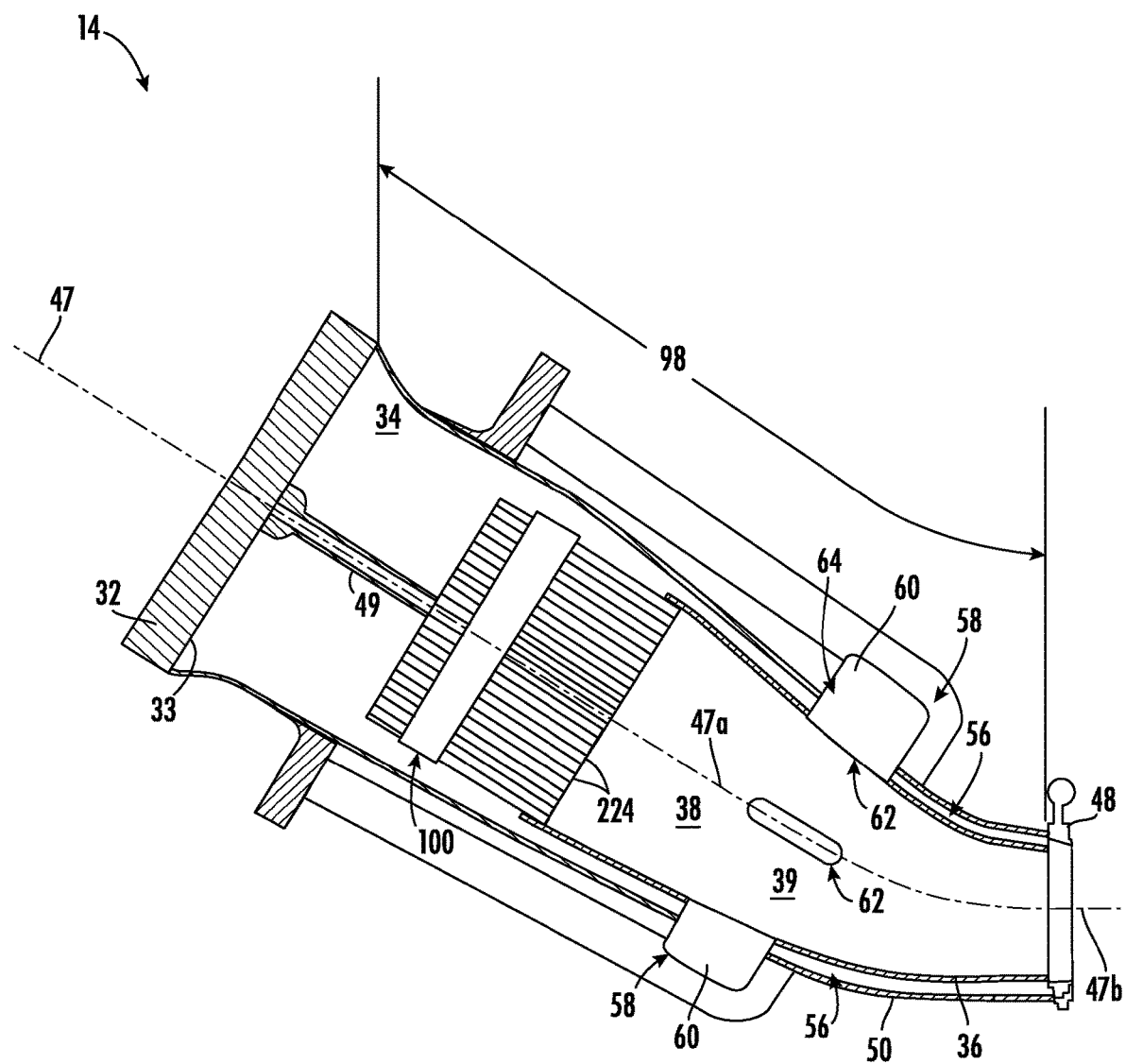
FIG. 3 illustrates a simplified cross-sectional side view of an exemplary combustor, in accordance with embodiments of the present disclosure.
Figure 4:
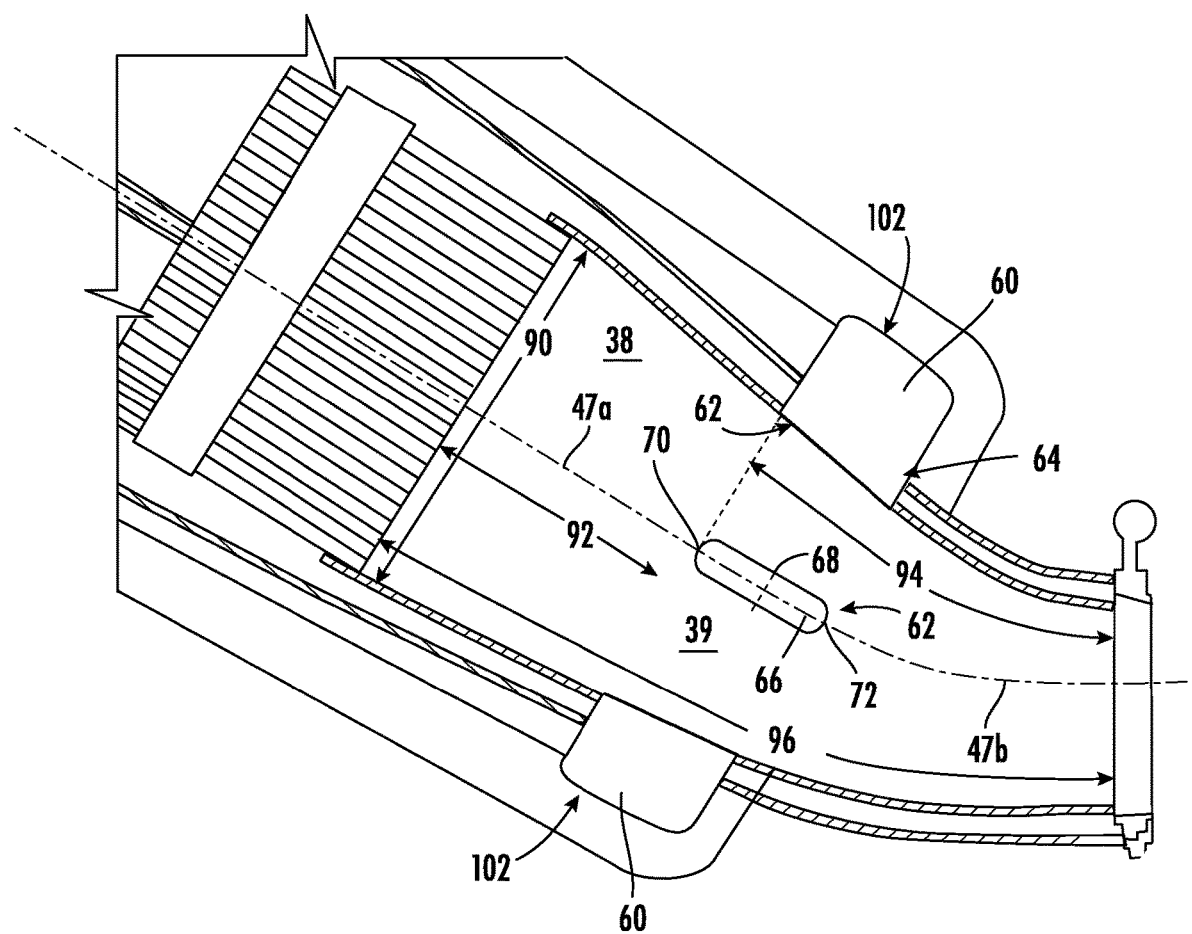
FIG. 4 illustrates an enlarged view of a simplified cross-sectional side view of an exemplary combustor, in accordance with embodiments of the present disclosure.

In many embodiments, such as the ones shown in FIGS. 3 and 4, the combustor 14 may include a first radial opening 62 and a second radial opening 64. The combustion liner 36 may define the first radial opening 62 downstream from the bundled tube fuel nozzle assembly 100, and the outer sleeve 50 may define the second radial opening 64. The first radial opening 62 and the second radial opening 64 may be aligned with one another in both the radial R and axial A directions.

Additionally, the first radial opening 62 and the second radial opening 64 may be equally sized, and each opening 62, 64 is shaped as a geometric stadium, i.e., a rectangle having two semi-circular ends opposite one another. The first radial opening 62 and the second radial opening 64 may each have a major axis 66 and a minor axis 68 (as shown in FIG. 4). The major axis 66 of both the first radial opening 62 and the second radial opening 64 may be the same length and aligned with one another. Similarly, the minor axis 68 of both the first radial opening 62 and the second radial opening 64 may be the same length and aligned with one another. The major axis 66 may be larger than the minor axis 68, and the major axis 66 may be generally parallel with the axial centerline 47 of the combustor 14. A fuel injector 60 may extend through the second radial opening 64 and the first radial opening 62 for delivering the second mixture of fuel and air into the second combustion zone 39.

As shown in FIG. 4, the first radial opening 62 and the second radial opening 64 may each include a forward end 70 and an aft end 72. The forward end 70 may be defined at the most upstream portion of the first and the second radial openings 62, 64, respectively. Likewise, the aft end 72 may be defined at the most downstream portion of the first and the second radial openings 62, 64, respectively. The first radial opening 62 and the second radial opening 64 may each extend from the respective forward ends 70 to the respective aft ends 72.

Figure 5:
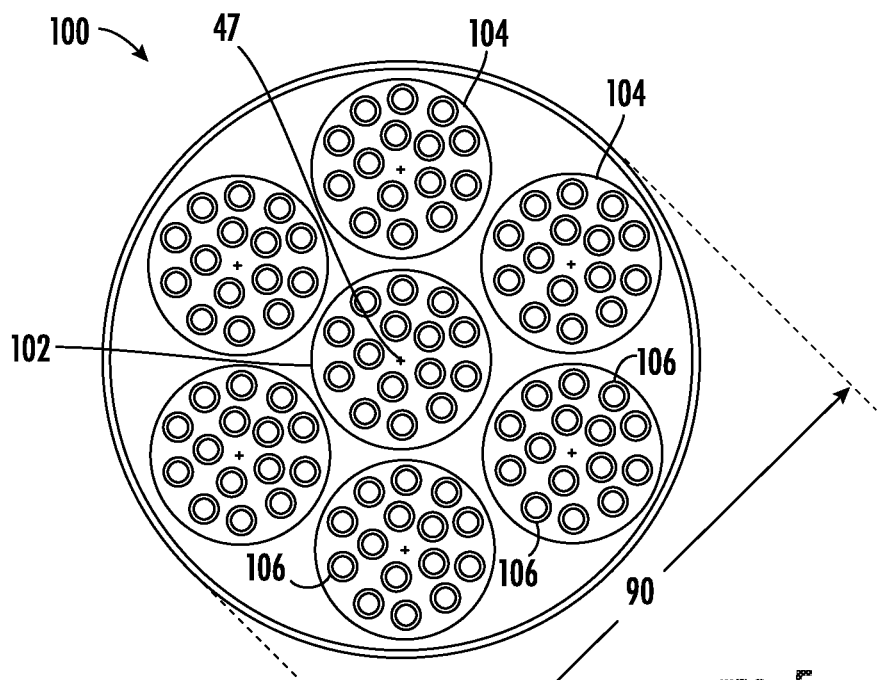
FIG. 5 illustrates a plan view of a bundled tube fuel nozzle assembly, as viewed from an aft end of a combustor looking in an upstream direction, in accordance with embodiments of the present disclosure.
Figure 6:
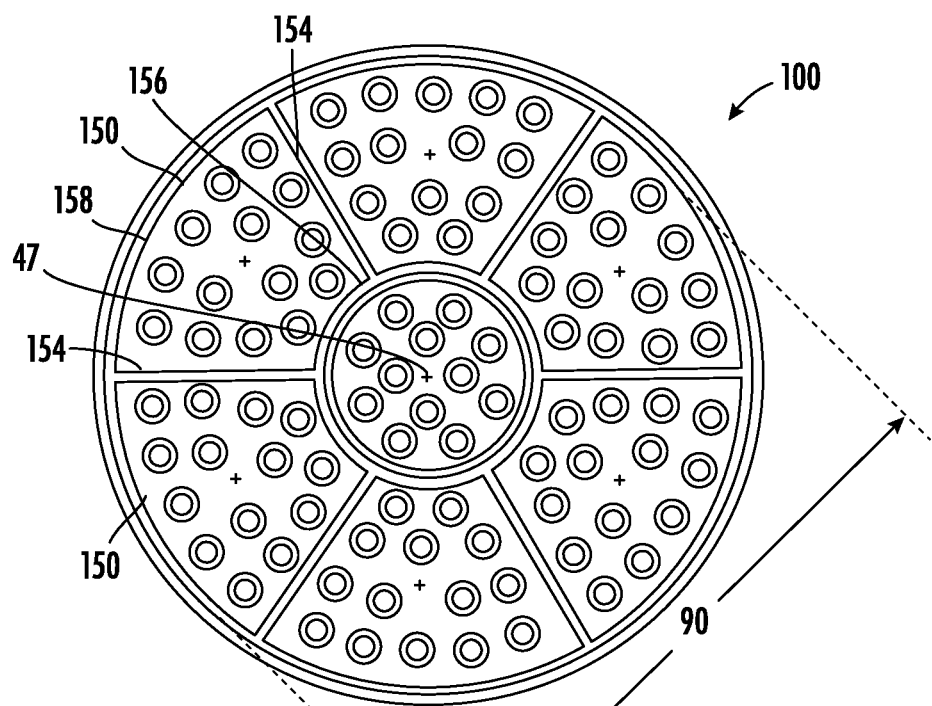
FIG. 6 illustrates a plan view of a bundled tube fuel nozzle assembly, as viewed from an aft end of a combustor looking in an upstream direction, in accordance with other embodiments of the present disclosure.

FIGS. 5 and 6 are plan views of embodiments of the bundled tube fuel nozzle assembly 100, as viewed from an aft end of the combustor 14 looking in an upstream direction. As shown, the bundled tube fuel nozzle assembly 100 may include a plurality of outer nozzles 104 annularly arranged around a center fuel nozzle 102.

As shown in FIG. 5, the center nozzle 102 and each outer nozzle 104 may be round or circular. The plurality of outer nozzles 104 are disposed about the center fuel nozzle 102 within a cap plate that is parallel to the end cover 32. Each fuel nozzle 102, 104 may be a bundled tube fuel nozzle having a plurality of tubes 106. The plurality of tubes 106 may be parallel, non-concentric mixing tubes that extend through a fuel plenum towards the first combustion zone 38. Each of the plurality of tubes 106 may be generally parallel to the axial centerline 47 of combustor 14. The cap plate may include a plurality of cooling holes to facilitate cooling of the cap plate.

As shown in FIG. 6, the center fuel nozzle 102 may be surrounded by a plurality of outer nozzles 150. Each fuel nozzle 102, 150 may include its own aft plate, which collectively define a downstream cap plate, or a single cap plate (not shown) may extend over the downstream ends of the tubes 106 in each fuel nozzle 102, 104. Each outer nozzle 150 has a truncated wedge shape, such that the outer nozzles 150 may be positioned in close proximity to the center fuel nozzle 102 and cover a majority of the area of the head end. The truncated wedge shape may be defined as having a pair of radial sides 154 that extend in opposite directions and that are joined by a first (radially inner) arcuate side 156 and a second (radially outer) arcuate side 158. The radially outer sides 158 define a radially outer perimeter or diameter 90 of the fuel nozzle segments 150 and, collectively, of the head end.

The specific size, spacing, and number of tubes 106 in the plurality of tubes 106 shown in the Figures (including FIGS. 5 and 6) is intended to be merely examples of the present bundled tube fuel nozzles 102, 104, 150 and should not be construed as limiting the present bundled tube fuel nozzles as having tubes of any particular size, spacing, or number. Moreover, it should be not construed as limiting the present bundled tube fuel nozzles as having tubes with a single tube diameter.

Figure 7:
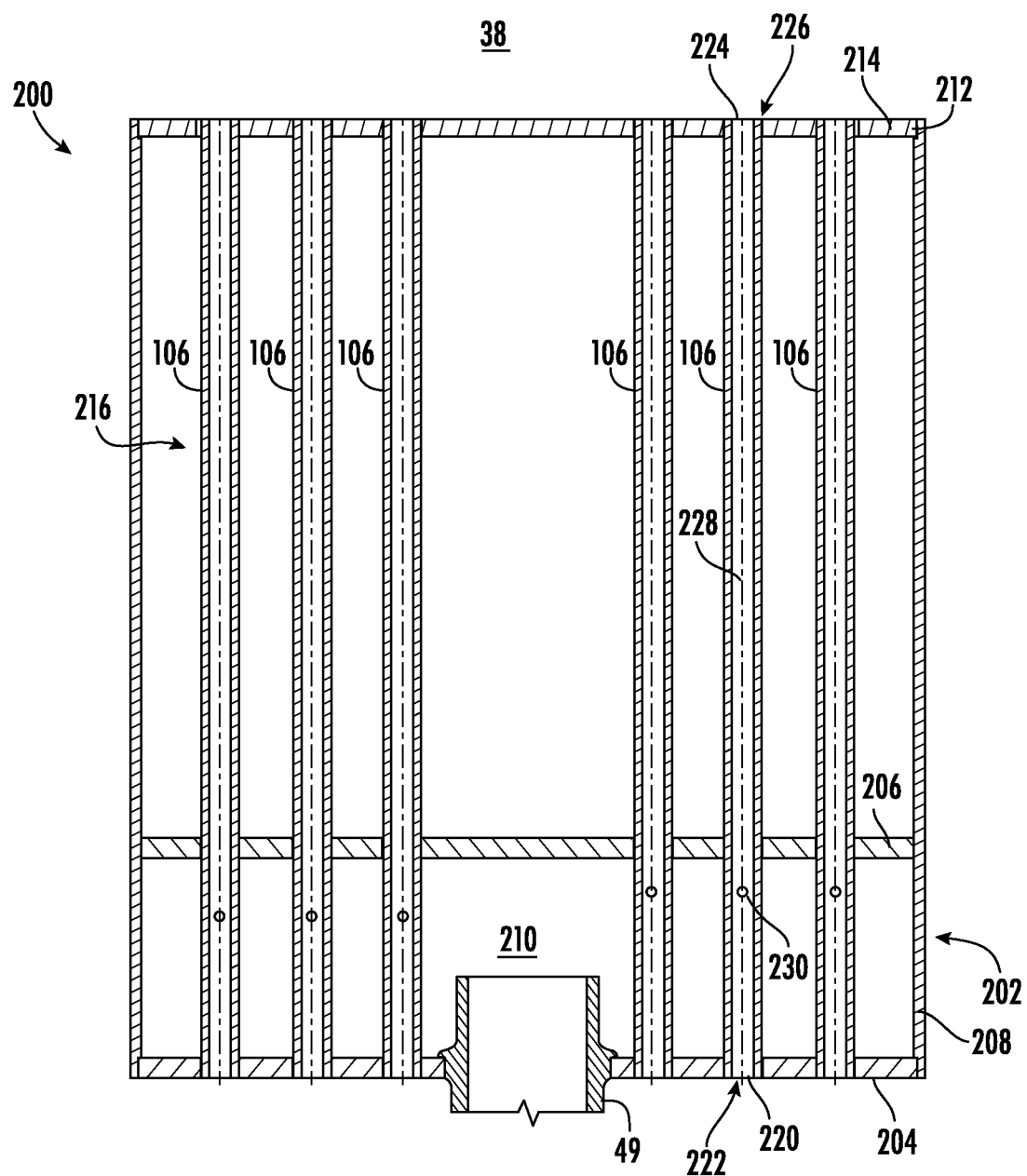
FIG. 7 illustrates a cross-sectional side view of a portion of a single bundled tube fuel nozzle, in accordance with embodiments of the present disclosure.

FIG. 7 provides a cross-sectional side view of a portion of a single bundled tube fuel nozzle 200 in an exemplary fuel nozzle assembly 100 as shown in FIG. 2, according to at least one embodiment of the present disclosure. Various embodiments of the combustor 14 may include different arrangements of the fuel nozzle assembly 100, and the combustor 14 is not limited to any particular arrangement, unless otherwise specified in the claims.

In at least one embodiment, as shown in FIG. 7, the fuel nozzle 200 includes a fuel plenum body 202 having a forward or upstream plate 204, an aft plate 206 axially spaced from the forward plate 204 and an outer band or shroud 208 that extends axially between the forward plate 204 and the aft plate 206. A fuel plenum 210 is defined within the fuel plenum body 202. In particular embodiments, the forward plate 204, the aft plate 206 and the outer band 208 may at least partially define the fuel plenum 210. In particular embodiments, the fluid conduit 49 may extend through the forward plate 204 to provide fuel 28 to the fuel plenum 210. In various embodiments, the fuel nozzle assembly 200 includes a cap plate 212 axially spaced from the aft plate 206. A hot side 214 of the cap plate 212 is generally disposed adjacent or proximate to the first combustion zone 38. The cap plate 212 may be unique to each fuel nozzle assembly 200 or may be common among all the fuel nozzle assemblies 200.

As shown in FIG. 7, the fuel nozzle assembly 200 may include a tube bundle 216 comprising a plurality of tubes 106. Each tube 106 may extend through the forward plate 204, the fuel plenum 210, the aft plate 206 and the cap plate 212. The tubes 106 are fixedly connected to and/or form a seal against the aft plate 206. For example, the tubes 218 may be welded, brazed or otherwise connected to the aft plate 206. Each tube 106 includes an inlet 220 defined at an upstream end 222 of each respective tube 106 and an outlet 224 defined at a downstream end 226 of each respective tube 106. Each tube 106 defines a respective premix flow passage 228 through the fuel nozzle 200. In particular embodiments, one or more tubes 106 of the plurality of tubes 106 is in fluid communication with the fuel plenum 210 via one or more fuel ports 230 defined within the respective tube(s) 106.

Figure 8:
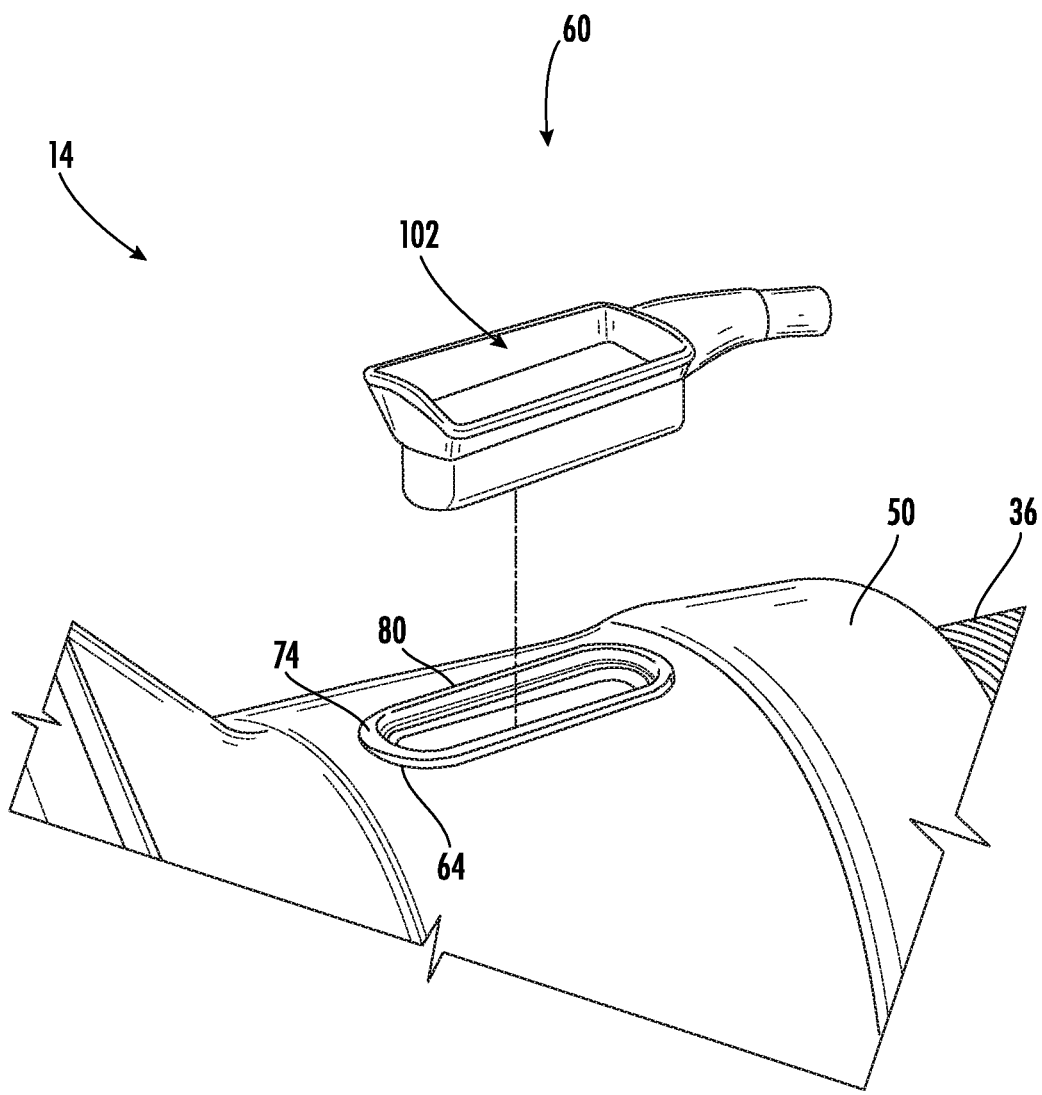
FIG. 8 is a perspective view of a portion of a combustor, in accordance with embodiments of the present disclosure.

As shown in FIG. 8, a jacket portion 74 may have the same cross-sectional shape as the first radial opening 62 and the second radial opening 64. In many embodiments, the jacket portion 74 may extend through the first radial opening 62 and the second radial opening 64 to create a passageway for an outlet member of the fuel injector 60 to pass therethrough. For example, the jacket portion 74 may have a geometric stadium cross-sectional area, i.e. a rectangle having circular ends. The jacket portion 78, which extends through the outer sleeve 50 to the liner 36, creates an impediment to the flow of compressed air through the annulus 56 (FIG. 2) between the liner 36 and the outer sleeve 50. Because the geometric stadium shape of the jacket portion 78 produces a smaller blockage in the annulus 56 than, for example, a jacket portion having a round shape, the jacket portion 78 advantageously allows for a fuel/air mixture to be introduced by the fuel injector 60 at the second combustion zone 39. The outlet member of the fuel injector 60 may extend through the jacket portion 74, thereby extending through the second radial opening 64 and the first radial opening 62. In many embodiments, the fuel injector 60 may include an air passage 102. The air passage 102 may fluidly couple the fuel injector 60 to the high pressure plenum 30 and the second combustion zone 39 (FIG. 2).

Reference will now be made back to FIGS. 2-4, which provide for different views of a combustor 14 in accordance with one or more embodiments of the present disclosure. As shown, in some embodiments, an aft end of the fuel nozzle assembly 100 may define a diameter 90 perpendicular to the axial centerline 47 of combustor 14. In other embodiments, the diameter 90 may be the inner diameter of the combustion liner 36 defined at the aft end of the fuel nozzle assembly. Specifically, the diameter 90 may be the inner diameter of the of the combustion liner measured at the outlets 224 of the bundled tube fuel nozzle assembly 100.

As shown in FIGS. 2-4, the axial centerline 47 of combustor 14 may be substantially curved or arcuate and may include a first portion 47a and a second portion 47b. The hot gas path 40 may flow along, and align with, the axial centerline of the combustor 14. The second portion 47b may be generally parallel to an axial centerline of the gas turbine 10, as the combustion gases 26 exit the aft end 46 of the combustor 14.

As shown in FIGS. 3 and 4, in some embodiments, the combustor 14 may also include a first combustion zone length 92, a second combustion zone length 94, a total combustion zone length 96, and a total combustor length 98.

The first combustion zone length 92 may be defined along the first portion 47a of the axial centerline 47. In many embodiments, the first combustion zone length 92 may be defined between the outlets 224 of the bundled tube fuel nozzle assembly 100 and the forward end 70 of the first radial opening 62. The first combustion zone length 92 may be the distance that the fuel 24 and compressed air 22 mixture exiting the bundled tube fuel nozzle assembly 100 travels before reaching the second combustion zone 39.

The second combustion zone length 94 may be defined downstream from the first combustion zone 38. In many embodiments, the second combustion zone length 94 may be along the axial centerline 47 of combustor 14 and defined between the forward end 70 of the first radial opening 62 and the aft frame 48. Alternatively, the second combustion zone length 94 may be defined between the forward end 70 of the second radial opening 64 and the aft frame 48. The second combustion zone length 94 may be the distance that the combustion gases 26 generated by the air 22 and fuel 24 introduced by the fuel injectors 60 travel within the combustion liner 36 before reaching the turbine 16.

The total combustion zone length 96 may be the summation of the first combustion zone length 92 and the second combustion zone length 94. In many embodiments, the total combustion zone length 96 may be defined between the outlets 224 of the bundled tube fuel nozzle assembly 100 and the aft frame 48. In many embodiments, the total combustion zone length 96 may be the total distance that the combustion gases 26 travel within the combustion liner 36 before reaching the turbine 16.

As shown in FIG. 3, the total length 98 of the combustor 14 may be defined along the axial centerline 47 of the combustor 14, and, in many embodiments, the total length 98 may be defined between the end cover 32 and the aft frame 48. Specifically, the total length 600 may be defined between the inner surface 33 of the end cover 32 and the aft frame 48. Because the total length 98 of the combustor 14 may be defined along the axial centerline 47, the total length 98 may be defined along a curve, as shown in FIG. 3, and measured accordingly.

Utilizing a bundled tube fuel nozzle assembly 100 along with a plurality of fuel injectors 60 may advantageously allow for an optimally minimized first combustion zone length 92 and second combustion zone length 94. Because each tube 106 in each bundled tube fuel nozzle 200 may be substantially parallel to one another and parallel to the axial centerline 47 of combustor 14, the bundled tube fuel nozzle assembly 100 does not impart any swirl on the fuel/air mixture entering the first combustion zone 38. Specifically, the fuel/air mixture exiting the respective outlet 224 of each tube 106 in the plurality of tubes 106 may travel along the axial direction without bulk swirl and may travel generally axially with respect to an axial centerline 47 of combustor 14. In many embodiments, the fuel/air mixture exiting the bundled tube fuel nozzle assembly may have a uniform velocity, fuel-air ratio, and temperature, which may result in a lower NOx production. The non-swirling flow of the fuel/air mixture exiting the bundled tube fuel nozzle assembly 100 advantageously allows for a quick combustion time within the first combustion zone 38. Moreover, the relatively small diameter of each tube 106 produces a correspondingly small and relatively short flame length. Accordingly, the first combustion zone length 92 may be shortened or compacted as compared to head ends with conventional swirling fuel nozzles ("swozzles"), thereby reducing the amount of time the combustion gases 26 spend at high temperatures within the combustor 14, which in turn results in a significant decrease in the overall nitrogen oxide (NOx) emissions. For example, in some embodiments, the ratio between the first combustion zone length 92 and the diameter 90 may be optimally minimized to reduce overall nitrogen oxide (NOx) emissions. In some embodiments, the first combustion zone length 92 and the diameter 90 may be optimized for lower emissions over a range of operating loads, including operating with the primary bundled tube fuel nozzle by itself (partial-load) and operating both the primary and the secondary combustion stages (higher-load).

In some embodiments, the first combustion zone length 92 may be between about 45% and about 80% of the diameter 90. In many embodiments, the first combustion zone length 92 may be between about 50% and about 70% of the diameter 90. In various embodiments, the first combustion zone length 92 may be between about 50% and about 80% of the diameter 90.

In other embodiments, the ratio between the second combustion zone length 94 and the diameter 90 may be optimally minimized. In many embodiments, the second combustion zone length 94 and the diameter 90 may be optimized for base-load NOx emissions, e.g., as small as possible to minimize NOx but large enough to burn fuel 24 completely.

For example, in some embodiments, the second combustion zone length 94 may be between about 120% and about 180% of the diameter 90 of the bundled tube fuel nozzle assembly 100. In many embodiments, the second combustion zone length 94 may be between about 130% and about 180% of the diameter 90 of the bundled tube fuel nozzle assembly 100. In various embodiments, the second combustion zone length 94 may be between about 150% and about 170% of the diameter 90 of the bundled tube fuel nozzle assembly 100.

Figure 9:
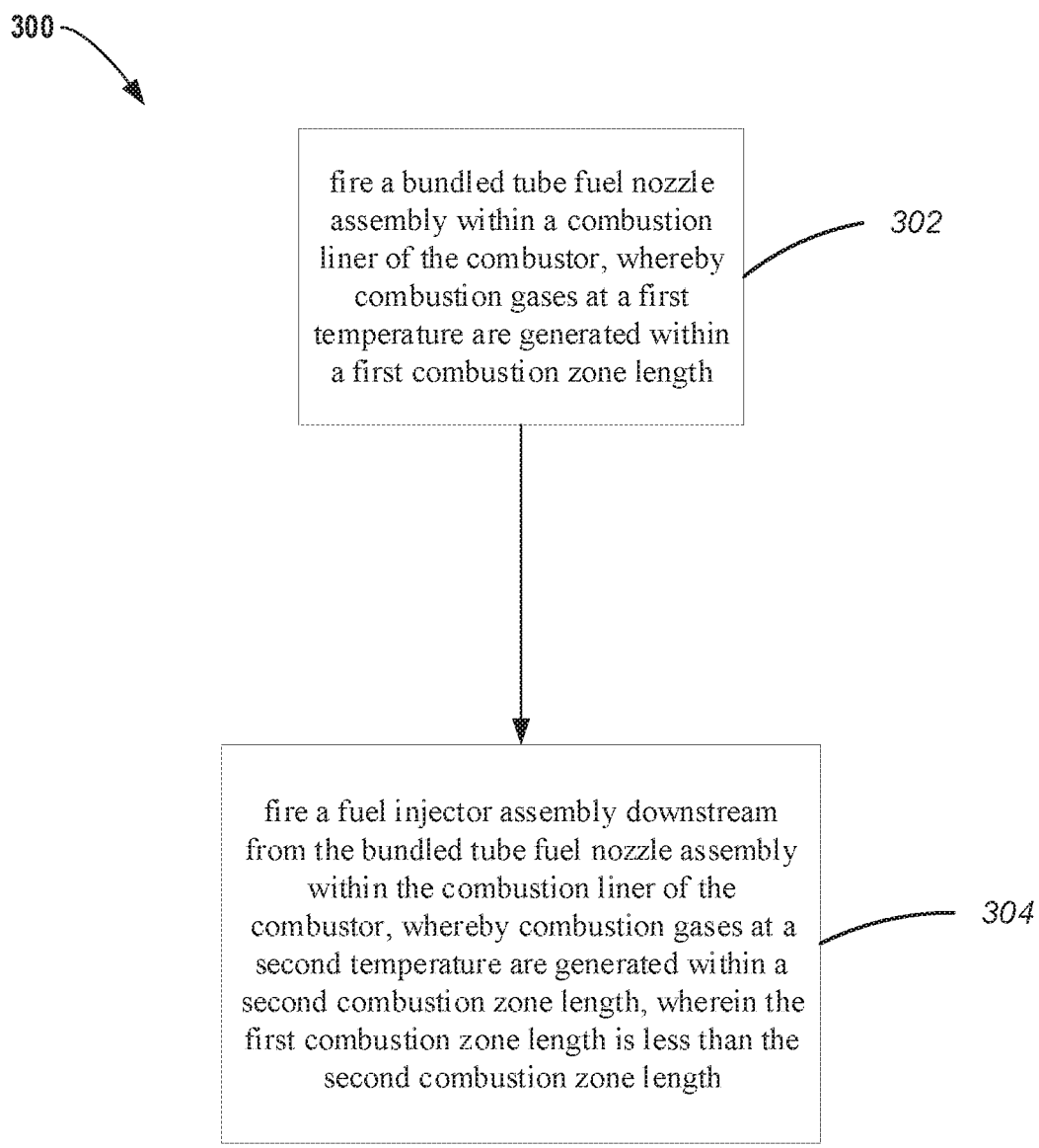
FIG. 9 illustrates a method of operating a combustor, in accordance with embodiments of the present disclosure.

FIG. 9 provides a flow chart, which graphically illustrates an example method 300 of operating a combustor, such as the combustor 14 described herein, in accordance with one or more example embodiments of the present disclosure. As illustrated in FIG. 9, the method 300 may include a step 302 of firing a bundled tube fuel nozzle assembly 100 within a combustion liner 36 of the combustor 14. As a result of step 302, combustion gases 26 at a first temperature may be generated within a first combustion zone length 92. In many embodiments, firing a bundled tube fuel nozzle assembly 100 may include injecting a first combustible mixture into the first combustion zone 38 and burning the first combustible mixture within the first combustion zone 38 to produce the combustion gases 26.

The method 300 may also include a step 304 of firing a fuel injector 60 downstream from the bundled tube fuel nozzle assembly 100 within the combustion liner 36 of the combustor 14. As a result of step 304, combustion gases 26 at a second temperature may be generated within a second combustion zone length 94. In some embodiments, firing a fuel injector 60 includes injecting a second combustible mixture into a second combustion zone 39 downstream from the first combustion zone 38, the second combustible mixture burning in the second combustion zone 39 and combining with the combustion gases 26 from the first combustion zone 38.

As shown in FIG. 4, in some embodiments, the first combustion zone length 92 may be less than less than the second combustion zone length 94. In some embodiments (not shown), the method 300 may also include providing the combustion gases 26 at the second temperature to a turbine 16 downstream of the combustor 14, wherein the combustion gases 26 travel from the combustor 14 to the turbine 16 over a period of time. Additionally, in some embodiments, the total time period may comprise a first portion of the total time period in the first combustion zone length 92 and a second portion of the total time period in the second combustion zone length 94. In many embodiments, the second portion of the total time period may be about 30% to about 50% of the total time period. In other embodiments, the second portion of the total time period may be between about 35% and about 45% of the total time period.

Utilizing a bundled tube fuel nozzle assembly 100 along with a plurality of fuel injectors 60 may advantageously allow for the time combustion gases 26 spend within the combustion zone to be optimally minimized. For example, because each tube 106 in each bundled tube fuel nozzle 200 may be substantially parallel to one another and parallel to the axial centerline 47 of combustor 14, the bundled tube fuel nozzle assembly 100 does not impart any swirl on the fuel/air mixture entering the first combustion zone 38. Specifically, the fuel/air mixture exiting the respective outlet 224 of each tube 106 in the plurality of tubes 106 may have a laminar flow and may travel generally axially with respect to the axial centerline 47 of the combustor 14. The non-swirling, laminar flow of the fuel/air mixture exiting the bundled tube fuel nozzle assembly 100 advantageously allows for a quick combustion time within the first combustion zone 38. Accordingly, the first combustion zone length 92 may be shortened or compacted, thereby reducing the amount of time the combustion gases 26 spend at high temperatures within the combustor 14, which results in a significant decrease in the overall nitrogen oxide (NOx) emissions.

Additionally, by introducing more fuel and air through the plurality of fuel injectors downstream from the bundled tube fuel nozzle assembly 100, the overall mass flow rate of the combustion gases 26 flowing through the second combustion zone 39 is increased. This increase in mass flow rate results in an increase in the overall velocity of the combustion gases traveling through the second combustion zone, thereby allowing the combustion gases to accelerate quickly through the second combustion zone length 94. Minimizing the amount of time combustion gases spend at peak temperatures advantageously results in a large decrease in the overall nitrogen oxide (NOx) emissions.

This written description uses examples to disclose the invention, including the best mode, and also to enable any person skilled in the art to practice the invention, including making and using any devices or systems and performing any incorporated methods. The patentable scope of the invention is defined by the claims and may include other examples that occur to those skilled in the art. Such other examples are intended to be within the scope of the claims, if they include structural elements that do not differ from the literal language of the claims, or if they include equivalent structural elements with insubstantial differences from the literal language of the claims.

What is claimed is:

1. A combustor comprising:
an end cover defining a forward end of the combustor;
a combustion liner having an upstream end and a downstream end;
a bundled tube fuel nozzle assembly comprising a plurality of bundled tube fuel nozzles fluidly coupled to the end cover at the upstream end of the combustion liner and extending to a plurality of outlets in a cap plate, the cap plate defining a diameter of the bundled tube fuel nozzle assembly;
a plurality of fuel injectors coupled to the combustion liner and disposed downstream from the plurality of bundled fuel nozzles and upstream from an aft frame, the aft frame coupled to the downstream end of the combustion liner;
wherein the combustion liner defines a combustion zone between the plurality of outlets and the aft frame through which combustion gases travel over a total time period, the combustion zone comprising:
a first combustion zone defined between the plurality of outlets and a forward end of the plurality of fuel injectors through which the combustion gases from the plurality of bundled tube fuel nozzles flow over a first portion of the total time period, the first combustion zone defining a first combustion zone length between the plurality of outlets and the forward end of the plurality of fuel injectors;
a second combustion zone defined between the plurality of fuel injectors and the aft frame through which the combustion gases from the plurality of bundled tube fuel nozzles and the plurality of fuel injectors flow over a second portion of the total time period, the second combustion zone defining a second combustion zone length between the forward end of the plurality of fuel injectors and the aft frame; and
wherein the first combustion zone length is between about 45% and about 80% of the diameter of the bundled tube fuel nozzle assembly, and wherein the second combustion zone length is between about 120% and about 180% of the diameter of the bundled tube fuel nozzle assembly, and wherein the second portion of the total time period is between about 35% and about 45% of the total time period.

2. The combustor as in claim 1, further comprising an outer sleeve surrounding at least a portion of the combustion liner; wherein the combustion liner defines a first radial opening downstream from the plurality of bundled tube fuel nozzles; wherein the outer sleeve defines a second radial opening; wherein the second radial opening is aligned with the first radial opening; and wherein a fuel injector of the plurality of fuel injectors extends through the first radial opening and the second radial opening.

3. The combustor as in claim 2, wherein the first radial opening of the combustion liner and the second radial opening of the outer sleeve are shaped as a geometric stadium having a major axis and a minor axis, wherein the major axis is parallel with an axial centerline of the combustor.

4. The combustor as in claim 1, wherein each bundled tube fuel nozzle of the plurality of bundled tube fuel nozzles comprises a fuel plenum body comprising a forward wall, an aft wall, and an outer band; a fuel plenum defined within the fuel plenum body; and a plurality of tubes extending through the forward wall, the fuel plenum, and the aft wall.

5. A gas turbine comprising:
a compressor;
a turbine; and
a combustor disposed downstream from the compressor and upstream from the turbine, the combustor comprising:
an end cover defining a forward end of the combustor;
a combustion liner having an upstream end and a downstream end;
a bundled tube fuel nozzle assembly comprising a plurality of bundled tube fuel nozzles fluidly coupled to the end cover at the upstream end of the combustion liner and extending to a plurality of outlets in a cap plate, the cap plate defining a diameter of the bundled tube fuel nozzle assembly;

a plurality of fuel injectors coupled to the combustion liner and disposed downstream from the plurality of bundled fuel nozzles and upstream from an aft frame, the aft frame coupled to the downstream end of the combustion liner;

wherein the combustion liner defines a combustion zone between the plurality of outlets and the aft frame through which combustion gases travel over a total time period, the combustion zone comprising:

a first combustion zone defined between the plurality of outlets and a forward end of the plurality of fuel injectors through which the combustion gases from the plurality of bundled tube fuel nozzles flow over a first portion of the total time period, the first combustion zone defining a first combustion zone length between the plurality of outlets and the forward end of the plurality of fuel injectors;

a second combustion zone defined between the plurality of fuel injectors and the aft frame through which the combustion gases from the plurality of bundled tube fuel nozzles and the plurality of fuel injectors flow over a second portion of the total time period, the second combustion zone defining a second combustion zone length between the forward end of the plurality of fuel injectors and the aft frame; and wherein the first combustion zone length is between about 45% and about 80% of the diameter of the bundled tube fuel nozzle assembly, and wherein the second combustion zone length is between about 120% and about 180% of the diameter of the bundled tube fuel nozzle assembly, and wherein the second portion of the total time period is between about 35% and about 45% of the total time period.

6. The gas turbine as in claim 5, further comprising an outer sleeve surrounding at least a portion of the combustion liner; wherein the combustion liner defines a first radial opening downstream from the plurality of bundled tube fuel nozzles; wherein the outer sleeve defines a second radial opening; wherein the second radial opening is aligned with the first radial opening; and wherein a fuel injector of the plurality of fuel injectors extends through the first radial opening and the second radial opening.

7. The gas turbine as in claim 6, wherein the first radial opening of the combustion liner and the second radial opening of the outer sleeve are shaped as a geometric stadium having a major axis and a minor axis, wherein the major axis is parallel with an axial centerline of the combustor.

8. A method of operating a combustor, comprising:

firing a bundled tube fuel nozzle assembly within a combustion liner of the combustor, whereby combustion gases at a first temperature are generated within a first combustion zone length;

firing a fuel injector downstream from the bundled tube fuel nozzle assembly within the combustion liner of the combustor, whereby additional combustion gases are generated within a second combustion zone length, the additional combustion gases having a second temperature, wherein the first combustion zone length is defined between a plurality of outlets of the bundled tube fuel nozzle and a forward end of the fuel injector, wherein the second combustion zone length is defined between the forward end the fuel injector and an aft frame of the combustor, wherein the first combustion zone length is between about 45% and about 80% of a diameter of the bundled tube fuel nozzle assembly, and wherein the second combustion zone length is between about 120% and about 180% of the diameter of the bundled tube fuel nozzle assembly; and providing the additional combustion gases at the second temperature to a turbine downstream of the combustor, wherein the combustion gases and the additional combustion gases travel from the combustor to the turbine over a total time period, wherein the total time period comprises a first portion of the total time period in the first combustion zone length and a second portion of the total time period in the second combustion zone length, and wherein the second portion of the total time period is about 35% to about 45% of the total time period.

9. The method as in claim 8, wherein the bundled tube fuel nozzle assembly includes a cap plate that defines the diameter of the bundled tube fuel nozzle assembly.

10. The method as in claim 9, wherein the combustion liner defines a radial opening through which the fuel injector is disposed, wherein the radial opening is shaped as a geometric stadium having a major axis and a minor axis, and wherein the major axis is parallel with an axial centerline of the combustor.

* * * * *